United States Patent
Huang et al.

(10) Patent No.: US 9,793,820 B2
(45) Date of Patent: Oct. 17, 2017

(54) SIX-PHASE SUPPLIED TRANSFORMER RECTIFIER UNIT

(71) Applicant: The Boeing Company, Chicago, IL (US)

(72) Inventors: Jian Huang, Everett, WA (US); Christopher Mark Severns, Issaquah, WA (US); Alan Thomas Bernier, Woodinville, WA (US)

(73) Assignee: THE BOEING COMPANY, Chicago, IL (US)

( * ) Notice: Subject to any disclaimer, the term of this patent is extended or adjusted under 35 U.S.C. 154(b) by 174 days.

(21) Appl. No.: 14/202,888

(22) Filed: Mar. 10, 2014

(65) Prior Publication Data
US 2015/0256099 A1  Sep. 10, 2015

(51) Int. Cl.
| | |
|---|---|
| *H01F 30/12* | (2006.01) |
| *H02M 7/06* | (2006.01) |
| *H01F 38/00* | (2006.01) |
| *H02M 1/12* | (2006.01) |

(52) U.S. Cl.
CPC .............. *H02M 7/06* (2013.01); *H01F 38/00* (2013.01); *H01F 30/12* (2013.01); *H01F 2038/006* (2013.01); *H02M 2001/123* (2013.01); *Y10T 307/297* (2015.04)

(58) Field of Classification Search
CPC .. H02M 1/12; H02M 1/126; H02M 2001/123; H02M 7/06; H01F 30/12; Y10T 307/297
USPC .............................. 363/39, 44, 45; 336/5, 12
See application file for complete search history.

(56) References Cited

U.S. PATENT DOCUMENTS

| | | | |
|---|---|---|---|
| 7,772,953 B2 | 8/2010 | Huang et al. | |
| 7,772,954 B2 | 8/2010 | Huang et al. | |
| 8,315,071 B2 * | 11/2012 | Ganev | H02M 1/12 363/126 |
| 2007/0007908 A1 * | 1/2007 | Kim | H05B 41/2827 315/282 |
| 2013/0181643 A1 * | 7/2013 | Feng | H02P 27/06 318/400.3 |

FOREIGN PATENT DOCUMENTS

JP  2008278713 A  * 11/2008

OTHER PUBLICATIONS

English Translation for Abstract of JP2008-278713A.*

(Continued)

*Primary Examiner* — Jue Zhang
*Assistant Examiner* — Jye-June Lee
(74) *Attorney, Agent, or Firm* — Yee & Associates, P.C.

(57) ABSTRACT

A method and apparatus for forming a direct current power supply. An apparatus comprises a transformer and a rectifier. The transformer is figured to output a plurality of phase-shifted alternating currents in response to receiving a plurality of alternating currents. The plurality of alternating currents and the plurality of phase-shifted alternating currents form a plurality of input alternating currents that are offset relative to each other by one-twelfth of a cycle in phase. The rectifier is configured to form a direct current power supply having a common mode voltage reduced to zero within selected tolerances in response to receiving the plurality of input alternating currents.

20 Claims, 10 Drawing Sheets

(56) References Cited

OTHER PUBLICATIONS

Arvindan, A.N., Guha, A., 2011, "Novel Topologies of 24-Pulse Rectifier with Conventional Transformers for Phase Shifting," 1st Int. Conf. on Electrical Energy Systems, p. 108-114.*

Sekhar et al., "Power-Quality Improvement by Multi-Pulse AC-DC Converters for Varying Loads," International Journal of Scientific & Engineering Research, vol. 2, Issue 12, Dec. 2011, 12 pages, accessed Feb. 26, 2014. http://www.ijser.org/onlineResearchPaperViewer.aspx?Power-Quality-Improvement-by-UPQC-device-in-Doubly-Fed-Induction-Generator-Wind-Farm.pdf.

* cited by examiner

SIX-PHASE SUPPLIED TRANSFORMER RECTIFIER UNIT

BACKGROUND INFORMATION

1. Field

The present disclosure relates generally to a transformer rectifier unit. More particularly, the present disclosure relates to a transformer rectifier unit configured to create a dual-polarity direct current power supply in response to receiving six alternating currents having six different phases.

2. Background

Some devices may be powered using direct current (DC) power, while other devices may be powered using alternating current (AC) power. Some electrical systems may convert alternating current into direct current to provide a source of direct current power. In alternating current, the flow of electrical charge reverses direction periodically. The waveform of alternating current is typically an alternating waveform such as, for example, a sine wave. In direct current, the flow of electrical charge is unidirectional.

As one illustrative example, in certain aircraft applications, alternating current received from an alternating current power supply is used to provide direct current to one or more electrical components on the aircraft. The alternating current power supply may take the form of, for example, without limitation, an alternator, a generator, an auxiliary power unit, an engine, or some other type of power supply. The one or more electrical components supplied with the direct current may include, for example, without limitation, a locking mechanism, a motor, a computer system, a light system, or some other type of electrical component, device, or system on the aircraft.

A transformer rectifier unit (TRU) may be used to convert alternating current received from an alternating current power supply into direct current to form a direct current power supply. In one illustrative example, the output voltage of the alternating current power supply may have a first magnitude. In this example, the output voltage of the direct current power supply may be a dual-polarity output voltage having a second magnitude. The dual-polarity output voltage includes a positive voltage and a negative voltage, both of the second magnitude. The second magnitude of the dual-polarity output voltage may be higher or lower than the first magnitude of the output voltage of the alternating current power supply, depending on the implementation.

However, in some cases, noise is present in the dual-polarity output voltage of the direct current power supply formed by the transformer rectifier unit. This noise is typically carried in the common mode of the direct current power supply. In particular, the noise may be seen as a ripple in the common mode voltage of the direct current power supply. This ripple may be referred to as a common mode voltage ripple. The common mode voltage of the direct current power supply is one-half of the vector sum of the positive and negative voltages of the dual-polarity output voltage of the direct current power supply. Reducing the common mode voltage reduces undesired noise in the dual-polarity output voltage of the direct current power supply.

Some currently available transformer rectifier units use a common mode choke to reduce the common mode voltage below a selected threshold to reduce the noise in the dual-polarity output voltage of the direct current power supply. The common mode choke may be a configuration comprised of one or more capacitors, one or more resistors, one or more other electrical components, or some combination thereof. However, using a common mode choke may increase the weight and cost of the transformer rectifier unit more than desired. Therefore, it would be desirable to have a method and apparatus that take into account at least some of the issues discussed above, as well as other possible issues.

SUMMARY

In one illustrative embodiment, an apparatus comprises a transformer and a rectifier. The transformer is configured to output a plurality of phase-shifted alternating currents in response to receiving a plurality of alternating currents. The plurality of alternating currents and the plurality of phase-shifted alternating currents form a plurality of input alternating currents that are offset relative to each other by one-twelfth of a cycle in phase. The rectifier is configured to form a direct current power supply having a common mode voltage reduced to zero within selected tolerances in response to receiving the plurality of input alternating currents.

In another illustrative embodiment, an apparatus comprises a core having a plurality of legs, a plurality of first windings, a plurality of second windings, and a plurality of third windings. Each of the plurality of first windings is wrapped around a corresponding leg of the plurality of legs. Each of the plurality of second windings is connected to a corresponding first winding in the plurality of first windings to form a connection and wrapped around a same leg around which the corresponding first winding is wrapped. Each of the plurality of third windings is wrapped around one of the plurality of legs. A third winding in the plurality of third windings that is wrapped around a particular leg in the plurality of legs is connected to the connection formed by a first winding in the plurality of first windings and a second winding in the plurality of second windings wrapped around a different leg in the plurality of legs than the particular leg.

In yet another illustrative embodiment, a method for forming a direct current power supply is provided. A plurality of phase-shifted alternating currents is generated in response to receiving a plurality of alternating currents at a transformer. The plurality of alternating currents and the plurality of phase-shifted alternating currents are received as a plurality of input alternating currents at a rectifier. The plurality of input alternating currents are offset relative to each other by one-twelfth of a cycle in phase. The direct current power supply having a common mode voltage reduced to zero within selected tolerances is formed in response to receiving the plurality of input alternating currents at the rectifier.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a transformer rectifier unit capable of creating a direct current power supply having a common mode voltage reduced to zero within selected tolerances. In particular, the illustrative embodiments recognize and take into account that it may be desirable to reduce the common mode voltage to zero within selected tolerances without using a common mode choke.

Further, the illustrative embodiments recognize and take into account that sending twelve alternating currents into a 24-pulse rectifier in which the twelve alternating currents are offset in phase relative to each other by about 30 degrees may result in a direct current power supply having a common mode voltage of substantially zero. Thus, the illustrative embodiments provide a transformer rectifier unit configured to convert a six-phase alternating current input received from an alternating current power supply into a twelve-phase alternating current input that may then be used to form a direct current power supply having a common mode voltage reduced to zero within selected tolerances.

Figure 1:
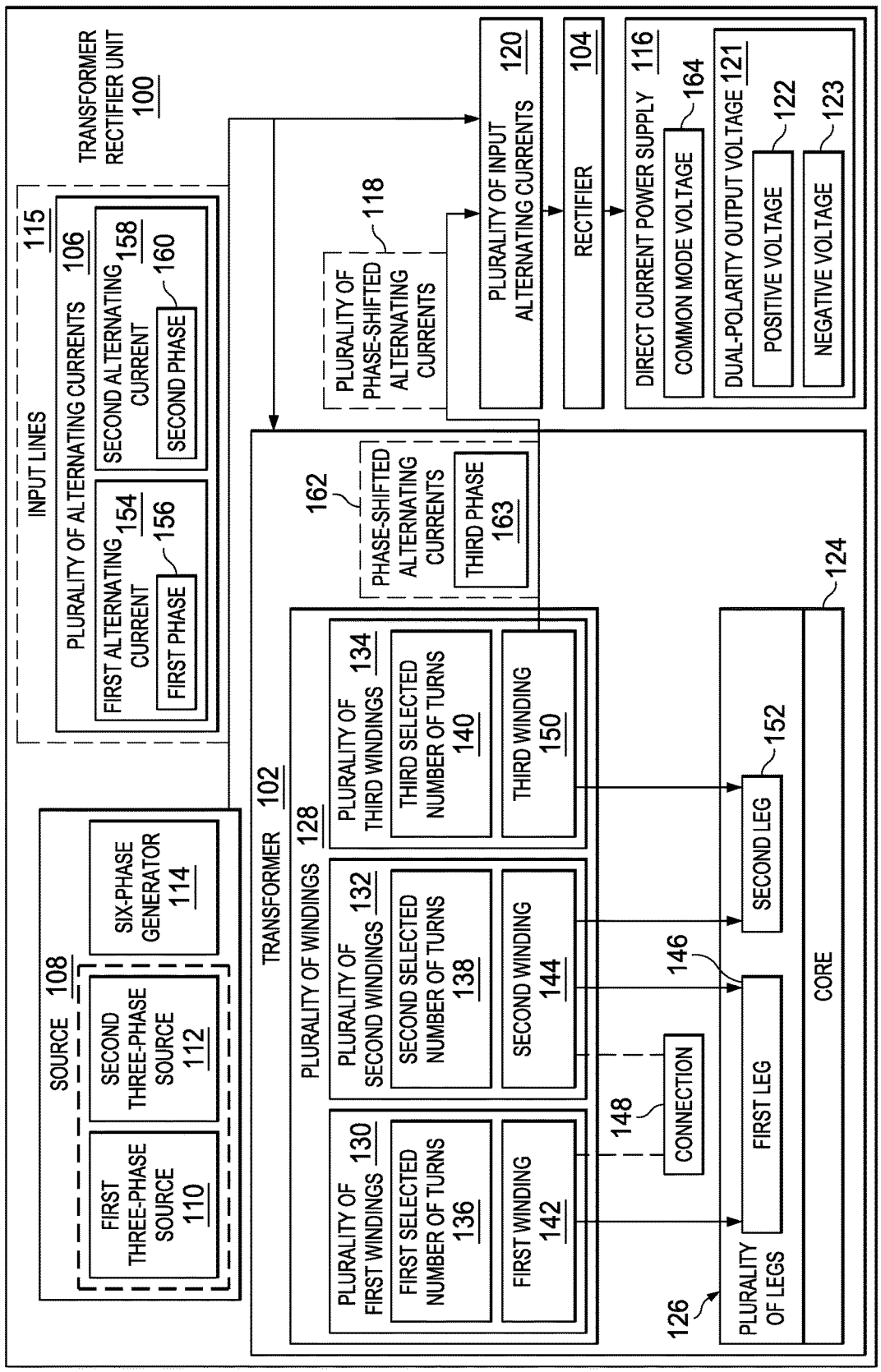
FIG. 1 is an illustration of a transformer rectifier unit in the form of a block diagram in accordance with an illustrative embodiment.

Referring now to the figures and, in particular, with reference to FIG. 1, an illustration of a transformer rectifier unit is depicted in the form of a block diagram in accordance with an illustrative embodiment. In this illustrative example, transformer rectifier unit (TRU) 100 includes transformer 102 and rectifier 104. Transformer 102 may take the form of an autotransformer or an isolation transformer, depending on the implementation. When transformer 102 is an autotransformer, transformer rectifier unit 100 may be referred to as an autotransformer rectifier unit (ATRU). When transformer 102 is an isolation transformer, transformer rectifier unit 100 may be referred to as an isolation transformer rectifier unit.

Both transformer 102 and rectifier 104 are configured to receive plurality of alternating currents 106 from source 108. Source 108 may be an alternating current power supply. In other words, source 108 is configured to provide alternating current power in the form of alternating currents, alternating voltages, or both.

As used herein, alternating voltage is voltage that reverses direction periodically. The waveform of alternating voltage is typically an alternating waveform such as, for example, a sine wave. Conversely, direct voltage is voltage that is unidirectional. As used herein, alternating voltage may be measured at a connection point, across a capacitor, or along a line with respect to a neutral point or ground.

Source 108 may take a number of different forms, depending on the implementation. In one illustrative example, source 108 may be comprised of first three-phase source 110 and second three-phase source 112. Each of first three-phase source 110 and second three-phase source 112 may be configured to provide three alternating currents having three different phases. In some cases, each of first three-phase source 110 and second three-phase source 112 may also be considered as providing three alternating voltages having three different phases.

As one illustrative example, first three-phase source 110 may provide three alternating currents offset in phase by about 120 degrees relative to each other. Second three-phase source 110 may provide three alternating currents offset in phase by about 120 degrees relative to each other. In this example, second three-phase source 112 may be offset in phase relative to first three-phase source 110 by about one-sixth of a cycle within selected tolerances. One-sixth of a cycle may be about 60 degrees. In this manner, source 108 may provide six alternating currents having phases offset by about 60 degrees relative to each other. In other words, source 108 may provide a six-phase alternating current input for transformer 102 and rectifier 104.

In one illustrative example, the selected tolerance for the phases of the six alternating currents provided by source 108 may be 20 degrees. In this manner, the six alternating currents provided by source 108 may be offset by 60 degrees, plus or minus 20 degrees.

In another illustrative example, source 108 may take the form of six-phase generator 114. Six-phase generator 114 may provide six alternating currents having phases offset by about 60 degrees relative to each other. In some cases, six-phase generator 114 may be considered as providing six alternating voltages having phases offset by about 60 degrees relative to each other.

Transformer 102 and rectifier 104 receive plurality of alternating currents 106 from source 108 through input lines 115. As used herein, a "line," such as one of input lines 115, may be comprised of any number of electrical lines, wires, or leads configured to carry electrical current. The alternating voltage carried along any one of input lines 115 may be measured with respect to a neutral point or ground.

Transformer 102 generates plurality of phase-shifted alternating currents 118 in response to receiving plurality of alternating currents 106. Plurality of phase-shifted alternating currents 118 may include six phase-shifted alternating currents in this illustrative example. Thus, transformer 102 may also provide six-phase shifted alternating voltages.

Plurality of alternating currents 106 and plurality of phase-shifted alternating currents 118 together form plurality of input alternating currents 120 for rectifier 104. In this illustrative example, plurality of input alternating currents 120 are offset relative to each other by about one-twelfth of a cycle in phase within selected tolerances. A complete cycle may be about 360 degrees. One-twelfth of the cycle may be about 30 degrees. Thus, plurality of input alternating currents 120 may include twelve input alternating currents having phases offset by about 30 degrees relative to each other.

In one illustrative example, the selected tolerance for the phases of plurality of input alternating currents 120 may be 20 degrees. In this manner, the twelve input alternating currents of plurality of input alternating currents 120 may be offset by 30 degrees, plus or minus 20 degrees. In this manner, plurality of input alternating currents 120 forms a twelve-phase alternating current input for rectifier 104.

In some cases, rectifier 104 may be considered as receiving twelve alternating voltages offset relative to each other by one-twelfth of a cycle in phase. In this manner, rectifier 104 may be considered as receiving a twelve-phase alternating voltage input.

In response to receiving plurality of input alternating currents 120, rectifier 104 creates direct current power supply 116. In particular, rectifier 104 forms direct current power supply 116 having dual-polarity output voltage 121. Dual-polarity output voltage 121 includes positive voltage 122 and negative voltage 123. Positive voltage 122 and negative voltage 123 may have the same magnitude in this illustrative example.

As depicted, transformer 102 includes core 124 having plurality of legs 126. Each of plurality of legs 126 is an elongated portion of core 124. In this manner, plurality of legs 126 may be unitary with core 124. As used herein, a first item that is "unitary" with a second item may be considered part of the second item. Plurality of legs 126 includes six legs in this illustrative example. Plurality of legs 126 includes as many legs as there are alternating currents in plurality of alternating currents 106.

Core 124 may be comprised of one or more different types of materials, depending on the implementation. For example, core 124 may be comprised of steel, iron, a metal alloy, some other type of metal, or a combination thereof.

Transformer 102 also includes plurality of windings 128 that are wound around plurality of legs 126. Each of plurality of windings 128 may take the form of a coil having one or more turns and comprised of a conductive material. The conductive material may be, for example, without limitation, aluminum, copper, a metal alloy, or some other type of conductive material.

In this illustrative example, plurality of windings 128 includes plurality of first windings 130, plurality of second windings 132, and plurality of third windings 134. Each of plurality of first windings 130, plurality of second windings 132, and plurality of third windings 134 may include six windings in this illustrative example. Thus, plurality of windings 128 may include eighteen windings.

As depicted, each first winding in plurality of first windings 130 has first selected number of turns 136. Each second winding in plurality of second windings 132 has second selected number of turns 138. Each third winding in plurality of third windings 134 has third selected number of turns 140.

First selected number of turns 136, second selected number of turns 138, and third selected number of turns 140 may be different. In one illustrative example, first selected number of turns 136 may be fewer than second selected number of turns 138 and third selected number of turns 140 may be fewer than first selected number of turns 136. First selected number of turns 136, second selected number of turns 138, and third selected number of turns 140 may be selected to generate the desired phase shifts needed to produce plurality of phase-shifted alternating currents 118.

Further, plurality of first windings 130, plurality of second windings 132, and plurality of third windings 134 may be wound around plurality of legs 126 and connected in a manner that results in common mode voltage 164 of direct current power supply 116 formed by rectifier 104 being reduced to zero within selected tolerances.

First winding 142 is an example of one of plurality of first windings 130. Second winding 144 is an example of one of plurality of second windings 132. First winding 142 and second winding 144 may be wrapped around first leg 146 in plurality of legs 126. Second winding 144 is connected to first winding 142 to form connection 148.

First winding 142 may be configured to receive first alternating current 154 in plurality of alternating currents 106. Second winding 144 may be configured to receive second alternating current 158 in plurality of alternating currents 106. First alternating current 154 may have first phase 156. Second alternating current 158 may have second phase 160. A difference between first phase 156 and second phase 160 may be about 60 degrees.

Third winding 150 is an example of one of plurality of third windings 134. Third winding 150 may be wrapped around second leg 152 in plurality of legs 126. Third winding 150 is connected to connection 148 between first winding 142 and second winding 144.

Third winding 150 is also connected to a line configured to carry phase-shifted alternating current 162 in plurality of phase-shifted alternating currents 118 to rectifier 104. Phase-shifted alternating current 162 has third phase 163 that is offset from each of first phase 156 and second phase 160 by about 30 degrees.

The other windings in plurality of windings 128 may be wrapped around the other legs in plurality of legs 126 and connected to each other in a manner similar to first winding 142, second winding 144, and third winding 150. In particular, each third winding in plurality of third windings 134 that is wrapped around a particular leg in plurality of legs 126 may be connected to the connection formed by a first winding in plurality of first windings 130 and a second winding in plurality of second windings 132 that are wrapped around a different leg in plurality of legs 126 than the particular leg.

Plurality of phase-shifted alternating currents 118 may be carried from plurality of third windings 134 to rectifier 104. Rectifier 104 also receives plurality of alternating currents 106 from source 108.

In response to receiving plurality of phase-shifted alternating currents 118 and plurality of alternating currents 106 as plurality of input alternating currents 120, rectifier 104 forms direct current power supply 116 having common mode voltage 164 reduced to zero within selected tolerances. With common mode voltage 164 reduced to substantially zero, undesired noise in dual-polarity output voltage 121 of direct current power supply 116 is also reduced to within selected tolerances.

Reducing undesired noise in dual-polarity output voltage 121 of direct current power supply 116 allows improved performance of the one or more electrical components configured to receive direct current power from direct current power supply 116. Thus, overall performance of the platform to which the one or more electrical components belong may also be improved. The platform may be, for example, without limitation, an aircraft, an unmanned aerial vehicle, a ship, a spacecraft, a ground vehicle, a piece of equipment, a landing system, or some other type of platform.

The illustration of transformer rectifier unit 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, source 108 may be comprised of six individual alternators configured to provide six alternating currents having phases offset by about 60 degrees relative to each other. In some illustrative examples, source 108 may be comprised of three two-phase sources, each configured to provide two alternating currents having phases offset by about 180 degrees relative to each other.

In other illustrative examples, a single winding wrapped around a leg in plurality of legs 126 may be used to function as both the first winding in plurality of first windings 130 and the second winding in plurality of second windings 132 wrapped around that leg. In some cases, a single winding wrapped around a leg in plurality of legs 126 may be used to function as the first winding in plurality of first windings 130, the second winding in plurality of second windings 132, and the third winding in plurality of third windings 134 wrapped around that leg. In these types of examples, the connections made between plurality of first windings 130, plurality of second windings 132, and plurality of third windings 134 may be made at tap points along the single winding wrapped or coiled around each leg in plurality of legs 126.

Figure 2:
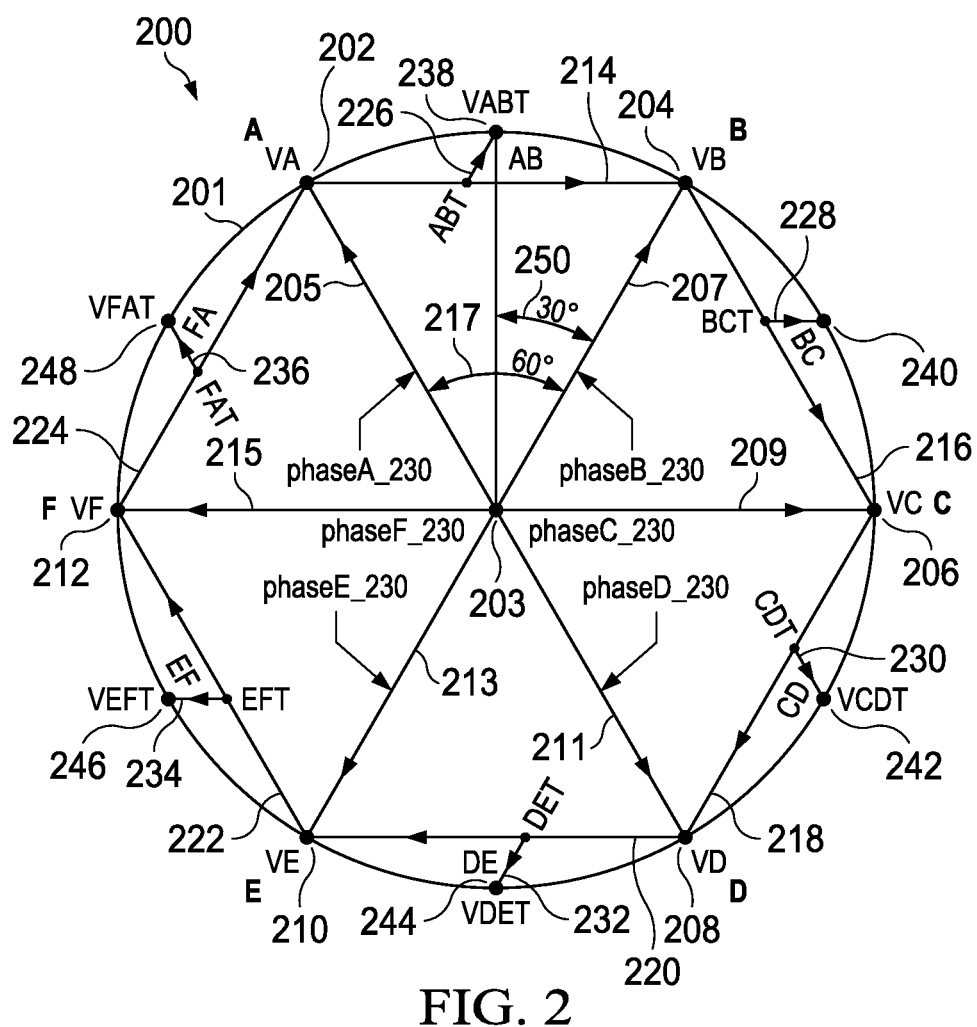
FIG. 2 is an illustration of a phasor diagram of a transformer in accordance with an illustrative embodiment.

With reference now to FIG. 2, an illustration of a phasor diagram of a transformer is depicted in accordance with an illustrative embodiment. In this illustrative example, phasor diagram 200 may represent a transformer implemented in a manner similar to transformer 102 in FIG. 1. Phasor diagram 200 includes circle 201 having center 203. Circle 201 represents 360 degrees of phase with respect to center 203.

As depicted in phasor diagram 200, the transformer may receive an alternating current through each of points 202, 204, 206, 208, 210, and 212. Thus, the transformer may have an alternating voltage at each of points 202, 204, 206, 208, 210, and 212.

Vectors 205, 207, 209, 211, 213, and 215 represent the phases of the alternating currents received through points 202, 204, 206, 208, 210, and 212, respectively. Further, vectors 205, 207, 209, 211, 213, and 215 may also represent the phases of the alternating voltages at points 202, 204, 206, 208, 210, and 212, respectively.

As depicted, the phases of the alternating currents received through points 202, 204, 206, 208, 210, and 212 are offset by about 60 degrees relative to each other. For example, angle 217 indicates that the difference in phase between the alternating current received through point 202 and the alternating current received through point 204 is about 60 degrees.

Vectors 214, 216, 218, 220, 222, and 224 represent the phases of the alternating currents carried by a plurality of first windings and a plurality of second windings wrapped around the plurality of legs of the transformer. Vectors 226, 228, 230, 232, 234, and 236 represent the phases of the phase-shifted alternating currents carried by a plurality of third windings wrapped around the plurality of legs of the transformer.

Points 238, 240, 242, 244, 246, and 248 represent the connections between the plurality of third windings and the lines configured to carry the phase-shifted alternating currents to a rectifier. As depicted, angle 250 indicates that the difference in phase between the alternating current received at point 204 and the phase-shifted alternating current sent from point 238 is about 30 degrees.

Figure 3:
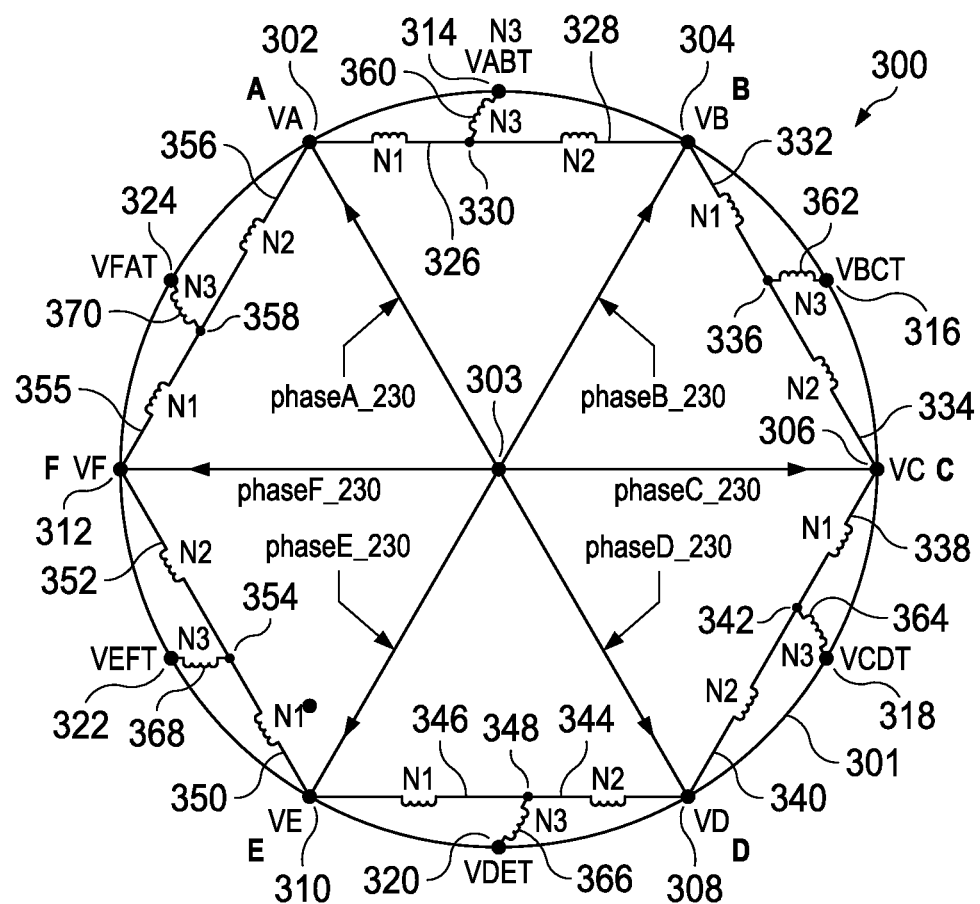
FIG. 3 is an illustration of a winding diagram for a transformer in accordance with an illustrative embodiment.

With reference now to FIG. 3, an illustration of a winding diagram for a transformer is depicted in accordance with an illustrative embodiment. In this illustrative example, winding diagram 300 may illustrate one manner in which the transformer represented by phasor diagram 200 in FIG. 2 may be implemented. Winding diagram 300 includes circle 301 and center 303. Circle 301 represents 360 degrees of phase with respect to center 303.

As depicted, winding diagram 300 includes connections 302, 304, 306, 308, 310, 312, 314, 316, 318, 320, 322, and 324. Winding diagram 300 also includes first winding 326 and second winding 328 connected at connection 330; first winding 332 and second winding 334 connected at connection 336; first winding 338 and second winding 340 connected at connection 342; first winding 344 and second winding 346 connected at connection 348; first winding 350 and second winding 352 connected at connection 354; and first winding 355 and second winding 356 connected at connection 358.

First winding 326 and second winding 328 may be wrapped around the leg represented by vector 214 in FIG. 2. First winding 332 and second winding 334 may be wrapped around the leg represented by vector 216 in FIG. 2. First winding 338 and second winding 340 may be wrapped around the leg represented by vector 218 in FIG. 2. First winding 344 and second winding 346 may be wrapped around the leg represented by vector 220 in FIG. 2. First winding 350 and second winding 352 may be wrapped around the leg represented by vector 222 in FIG. 2. Further, first winding 355 and second winding 356 may be wrapped around the leg represented by vector 224 in FIG. 2.

In this illustrative example, first winding 326 and second winding 356 are configured to receive an alternating current through connection 302. First winding 332 and second winding 328 are configured to receive an alternating current through connection 304. First winding 338 and second winding 334 are configured to receive an alternating current through connection 306. First winding 344 and second winding 340 are configured to receive an alternating current through connection 308. First winding 350 and second winding 346 are configured to receive an alternating current through connection 310. Further, first winding 355 and second winding 352 are configured to receive an alternating current through connection 312.

Winding diagram 300 also includes third windings 360, 362, 364, 366, 368, and 370. Third windings 360, 362, 364, 366, 368, and 370 are connected to connections 330, 336, 342, 348, 354, and 358, respectively. Further, third windings 360, 362, 364, 366, 368, and 370 are also connected to connections 314, 316, 318, 320, 322, and 324, respectively.

In this illustrative example, the angle of each of third windings 360, 362, 364, 366, 368, and 370 relative to center 303 indicates the leg around which that third winding is wrapped. For example, third winding 360 has an angle relative to center 303 that is substantially parallel to the angle of first winding 355 and second winding 356 and the angle of first winding 338 and second winding 340 in winding diagram 300. In this manner, third winding 360 connected to connection 330 may be the third winding wrapped around the leg either around which first winding 355 and second winding 356 or around which first winding 338 and second winding 340 are wrapped.

Figure 4:
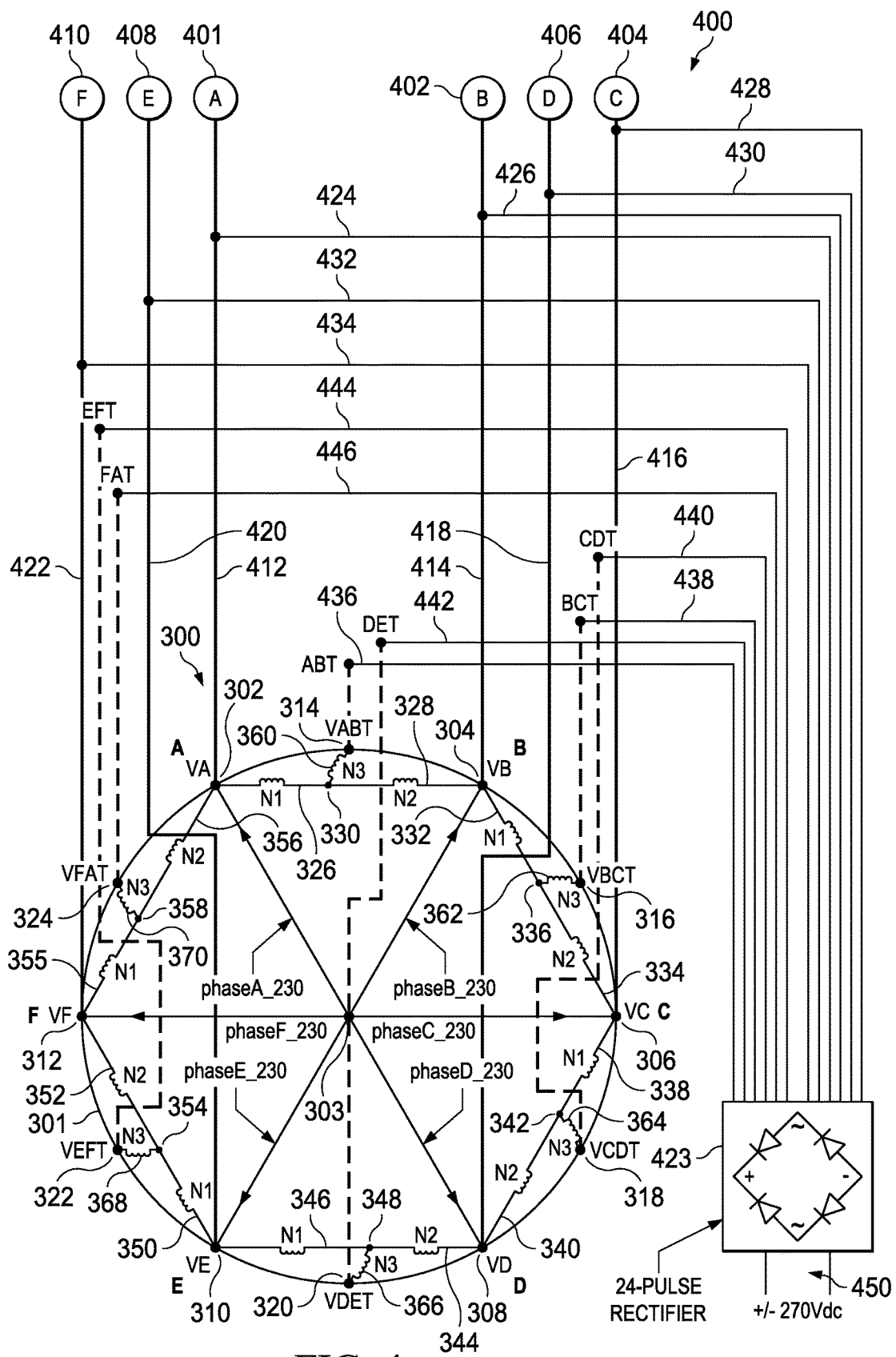
FIG. 4 is an illustration of a schematic diagram of a transformer rectifier unit in accordance with an illustrative embodiment.

With reference now to FIG. 4, an illustration of a schematic diagram of a transformer rectifier unit is depicted in accordance with an illustrative embodiment. In this illustrative example, schematic diagram 400 includes winding diagram 300 from FIG. 3.

As depicted, the transformer rectifier unit represented by schematic diagram 400 may be configured to receive alternating currents 401, 402, 404, 406, 408, and 410 through lines 412, 414, 416, 418, 420, and 422, respectively, connected to connections 302, 304, 306, 308, 310, and 312, respectively. Alternating currents 401, 402, 404, 406, 408, and 410 may be received from an alternating current power supply having a voltage level of about 230 volts.

Lines 424, 426, 428, 430, 432, and 434 may also carry alternating currents 401, 402, 404, 406, 408, and 410, respectively, to rectifier 423. Rectifier 423 is a 24-pulse rectifier in this illustrative example. Lines 436, 438, 440, 442, 444, and 446 are connected to connections 314, 316, 318, 320, 322, and 324, respectively. Lines 436, 438, 440, 442, 444, and 446 may carry the phase-shifted alternating currents produced in third windings 360, 362, 364, 366, 368, and 370, respectively, to rectifier 423.

Rectifier 423 is configured to form direct current power supply 450 in response to receiving the alternating currents and the phase-shifted alternating currents. Direct current power supply 450 may provide a dual-polarity output voltage having a positive voltage of about +270 volts and a negative voltage of about −270 volts.

Figure 5:
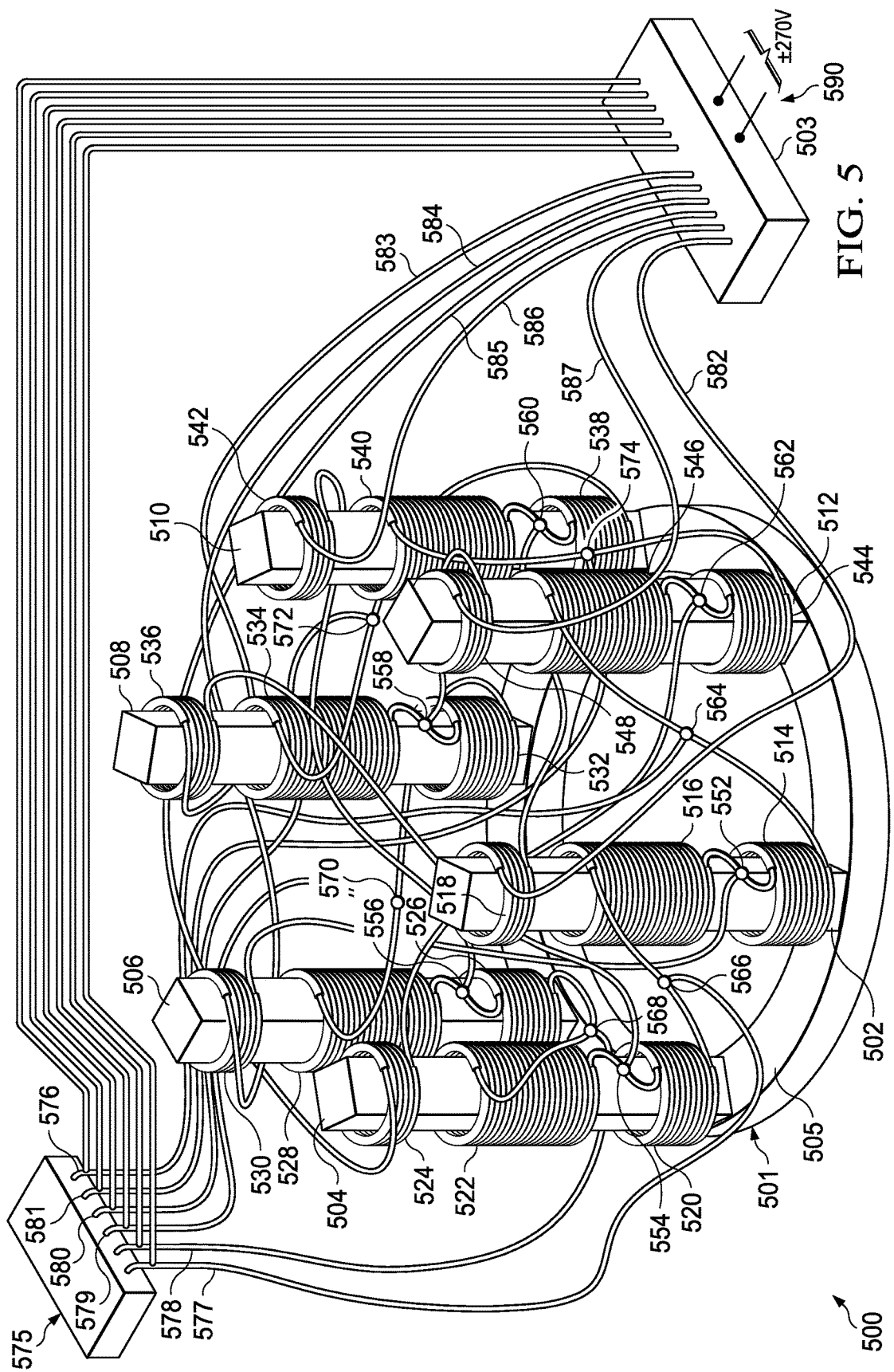
FIG. 5 is an illustration of a transformer rectifier unit implemented according to a schematic diagram in accordance with an illustrative embodiment.

With reference now to FIG. 5, an illustration of a transformer rectifier unit implemented according to schematic diagram 400 in FIG. 4 is depicted in accordance with an illustrative embodiment. In this illustrative example, transformer rectifier unit 500 is an example of one implementation for transformer rectifier unit 100 in FIG. 1. Transformer rectifier unit 500 is configured according to schematic diagram 400 in FIG. 4.

Transformer rectifier unit 500 includes transformer 501 and rectifier 503. Transformer 501 and rectifier 503 are examples of implementations for transformer 102 and rectifier 104, respectively, in FIG. 1. Transformer 501 includes core 505, which is an example of one implementation for core 124 in FIG. 1. Core 505 has legs 502, 504, 506, 508, 510, and 512. These legs may be an example of one implementation for plurality of legs 126 in FIG. 1.

First winding 514, second winding 516, and third winding 518 are wrapped around leg 502. First winding 520, second winding 522, and third winding 524 are wrapped around leg 504. First winding 526, second winding 528, and third winding 530 are wrapped around leg 506. First winding 532, second winding 534, and third winding 536 are wrapped around leg 508. First winding 538, second winding 540, and third winding 542 are wrapped around leg 510. First winding 544, second winding 546, and third winding 548 are wrapped around leg 512.

First windings 514, 520, 526, 532, 538, and 544 may be an example of one implementation for plurality of first windings 130 in FIG. 1. Second windings 516, 522, 528, 534, 540, and 546 may be an example of one implementation for plurality of second windings 132 in FIG. 1. Further, third windings 518, 524, 530, 536, 542, and 548 may be an example of one implementation for plurality of third windings 134 in FIG. 1.

In this illustrative example, first winding 514 is connected to second winding 516 at connection 552. First winding 520 is connected to second winding 522 at connection 554. First winding 526 is connected to second winding 528 at connection 556. First winding 532 is connected to second winding 534 at connection 558. First winding 538 is connected to second winding 540 at connection 560. First winding 544 is connected to second winding 546 at connection 562.

Additionally, first winding 514 is connected to second winding 546 at connection 564. First winding 520 is connected to second winding 516 at connection 566. First winding 526 is connected to second winding 522 at connection 568. First winding 532 is connected to second winding 528 at connection 570. First winding 538 is connected to second winding 534 at connection 572. Further, first winding 544 is connected to second winding 540 at connection 574.

As depicted, source 575 is configured to provide alternating currents to transformer 501 and rectifier 503. In particular, lines 576, 577, 578, 579, 580, and 581 may carry alternating currents to transformer 501 through connections 564, 566, 568, 570, 572, and 574, respectively, formed at transformer 501. These alternating currents have phases that are offset by about 60 degrees relative to each other.

Transformer 501 is configured to form phase-shifted alternating currents in response to receiving the alternating currents. These phase-shifted alternating currents are formed in third windings 518, 524, 530, 536, 542, and 548. Lines 582, 585, 584, 583, 586, and 587 carry the phase-shifted alternating currents produced by third windings 518, 524, 530, 536, 542, and 548, respectively, to rectifier 503.

Rectifier 503 is a 24-pulse rectifier configured to use the alternating currents and phase-shifted alternating currents received as input alternating currents at rectifier 503 to form direct current power supply 590. Direct current power supply 590 has a common mode voltage reduced to zero within selected tolerances.

The illustration of transformer rectifier unit 500 in FIG. 5 is not meant to imply physical or architectural limitations to the manner in which an illustrative embodiment may be implemented. Other components in addition to or in place of the ones illustrated may be used. Some components may be optional.

The different components shown in FIG. 5 may be illustrative examples of how components shown in block form in FIG. 1 can be implemented as physical structures. Additionally, some of the components in FIG. 5 may be combined with components in FIG. 1, used with components in FIG. 1, or a combination of the two.

Figure 6:
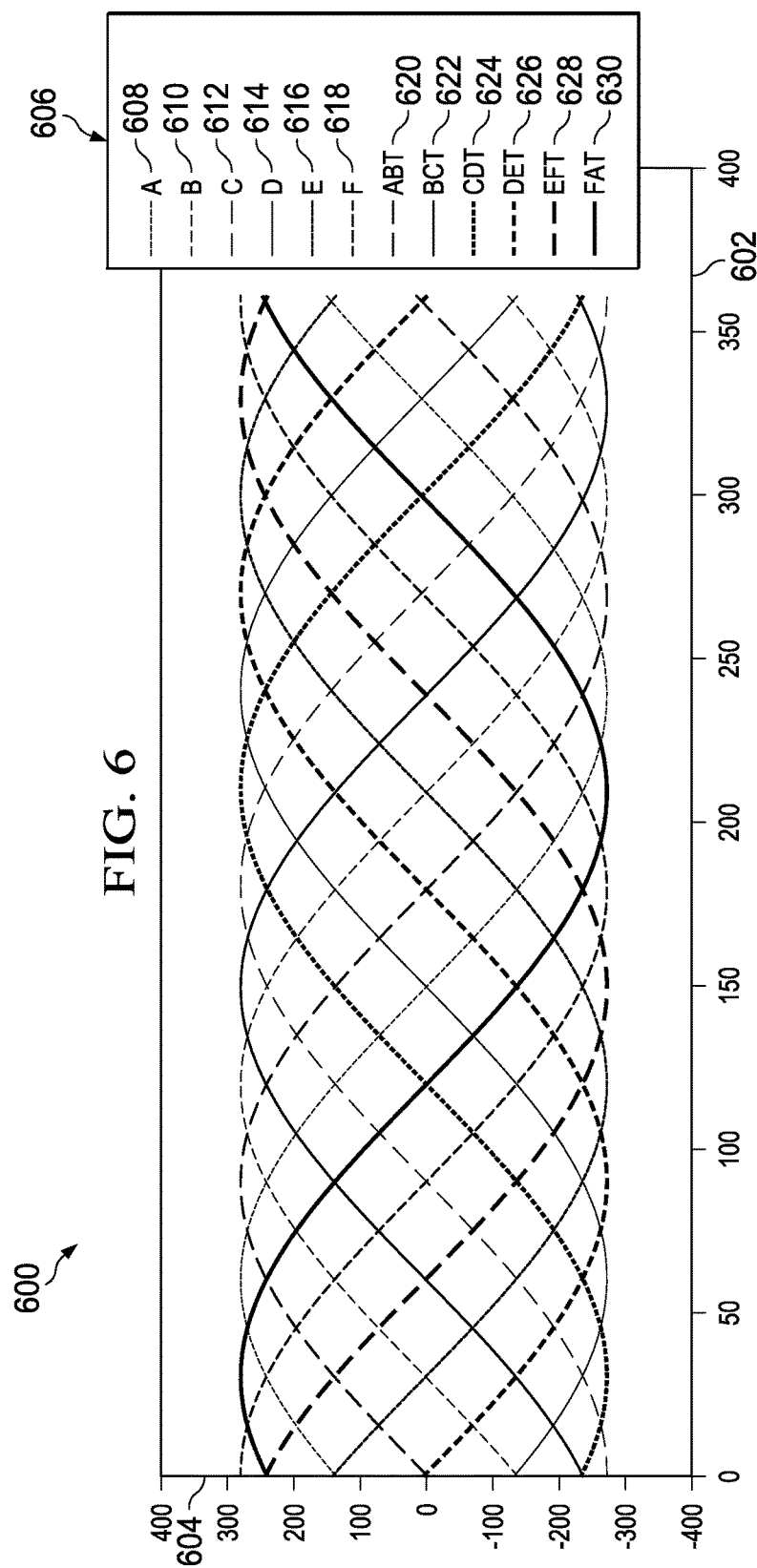
FIG. 6 is an illustration of a graph of voltages in accordance with an illustrative embodiment.

With reference now to FIG. 6, an illustration of a graph of voltages is depicted in accordance with an illustrative embodiment. In this illustrative example, graph 600 includes horizontal axis 602 and vertical axis 604. Horizontal axis 602 is phase in degrees. Vertical axis 604 is voltage level.

As indicated by legend 606, lines 608, 610, 612, 614, 616, 618, 620, 622, 624, 626, 628, and 630 are the voltages of lines 576, 577, 578, 579, 580, 581, 582, 583, 584, 585, 586, and 587, respectively, to rectifier 503 in FIG. 5. In this illustrative example, the voltage of a line, such as the voltage of line 576, may be measured with respect to ground or some neutral point. As depicted, the phases of the voltages illustrated by lines 608, 610, 612, 614, 616, 618, 620, 622, 624, 626, 628, and 630 are offset by about 30 degrees relative to each other.

Figure 7:
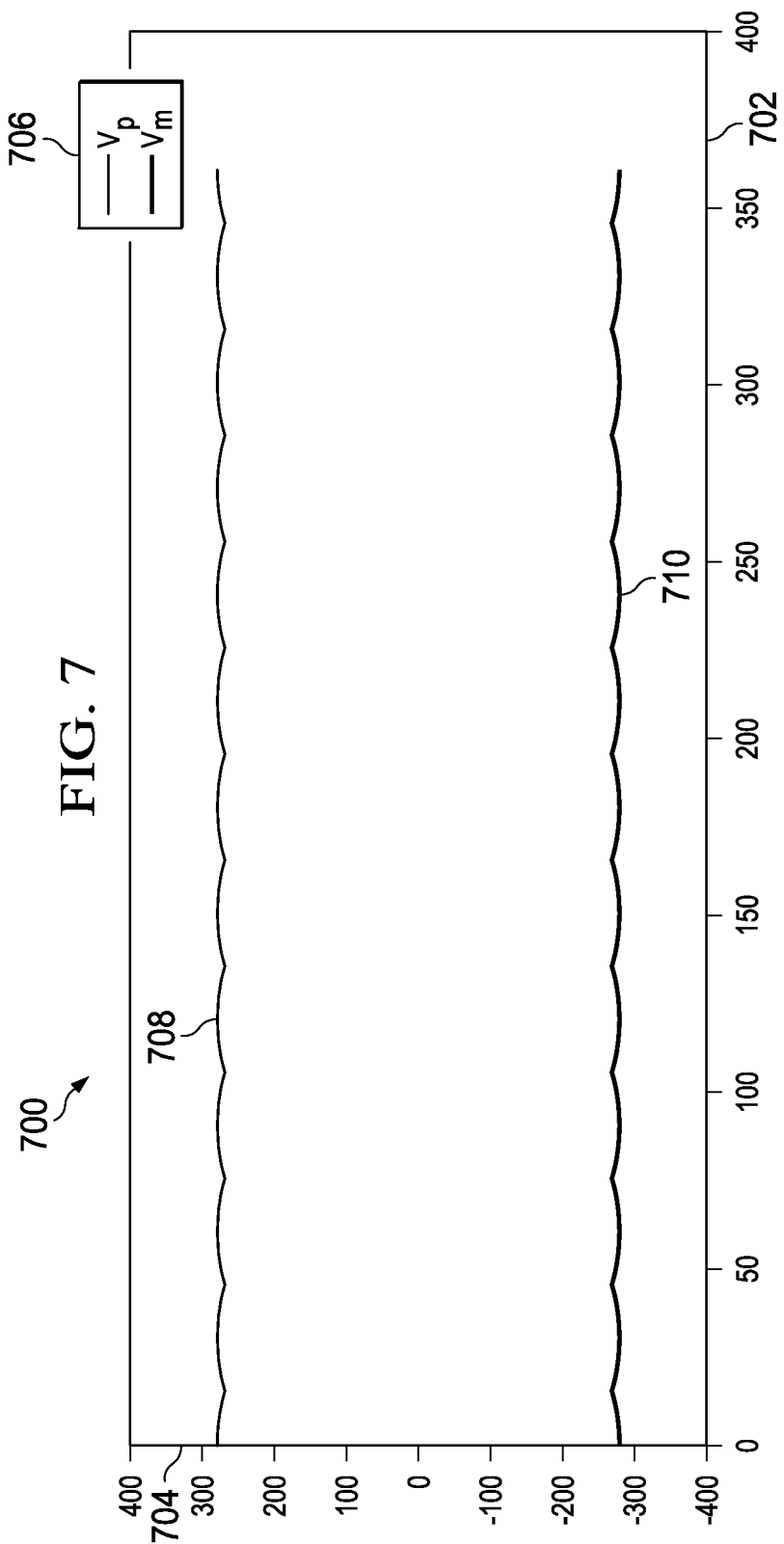
FIG. 7 is an illustration of a graph of voltages in accordance with an illustrative embodiment.

With reference now to FIG. 7, an illustration of a graph of voltages is depicted in accordance with an illustrative embodiment. In this illustrative example, graph 700 includes horizontal axis 702 and vertical axis 704. Horizontal axis 702 is phase in degrees. Vertical axis 704 is voltage level.

As indicated by legend 706, line 708 is the positive voltage of the dual-polarity output voltage of direct current power supply 590 formed by rectifier 503 in FIG. 5. Line 710 is the negative voltage of the dual-polarity output voltage of direct current power supply 590 formed by rectifier 503 in FIG. 5. As depicted, one cycle of each of the positive voltage and the negative voltage includes 24 pulses.

Figure 8:
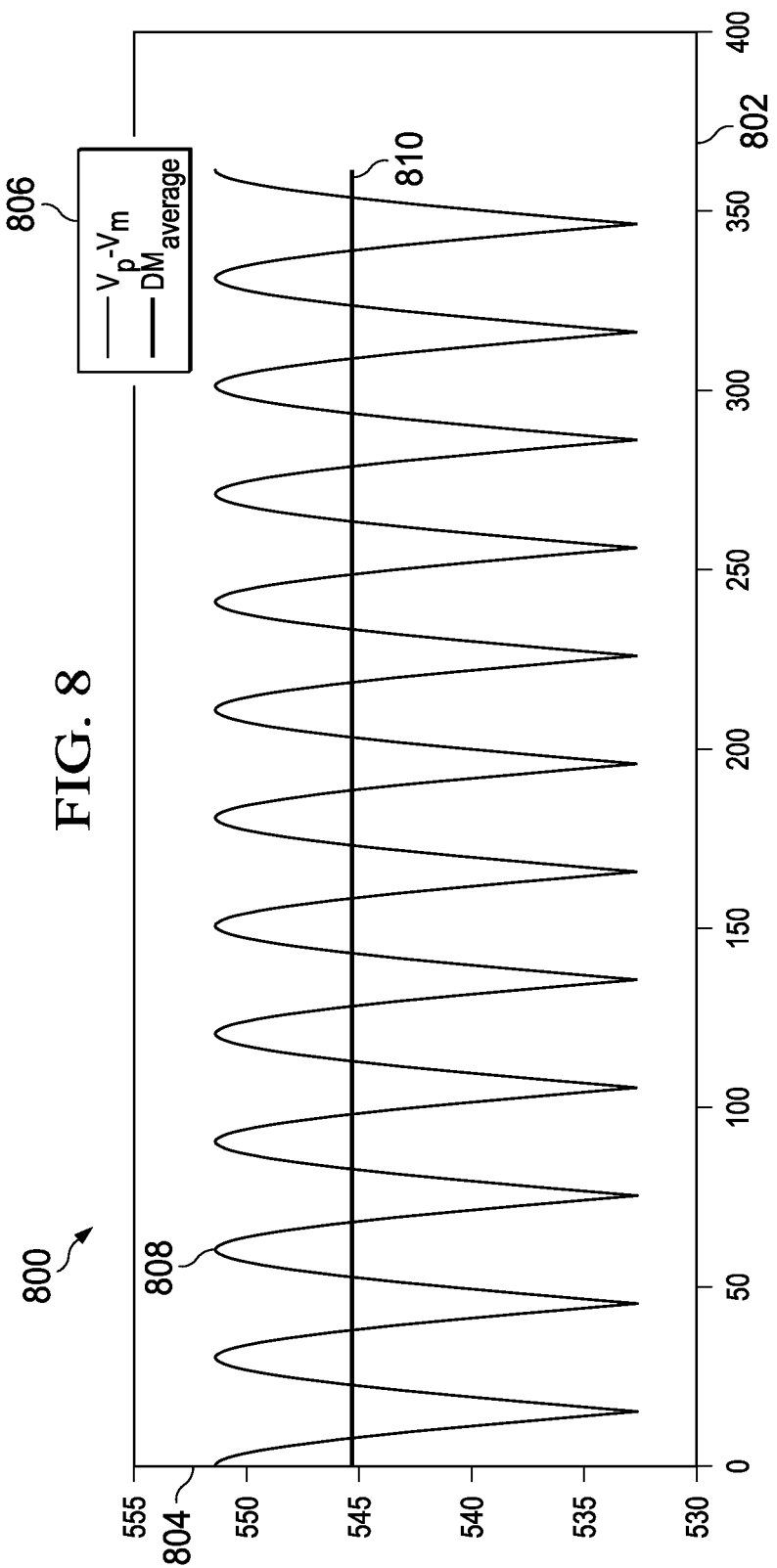
FIG. 8 is an illustration of a graph of differential mode voltage and average voltage in accordance with an illustrative embodiment.

With reference now to FIG. 8, an illustration of a graph of differential mode voltage and average voltage is depicted in accordance with an illustrative embodiment. In this illustrative example, graph 800 includes horizontal axis 802 and vertical axis 804. Horizontal axis 802 is phase in degrees. Vertical axis 804 is voltage level.

As indicated by legend 806, line 808 is differential mode voltage and line 810 is average voltage. The differential mode voltage is the differential mode voltage of direct current power supply 590 formed by rectifier 503 in FIG. 5. The average voltage is the average of the dual-polarity output voltage of direct current power supply 590 formed by rectifier 503 in FIG. 5.

Figure 9:
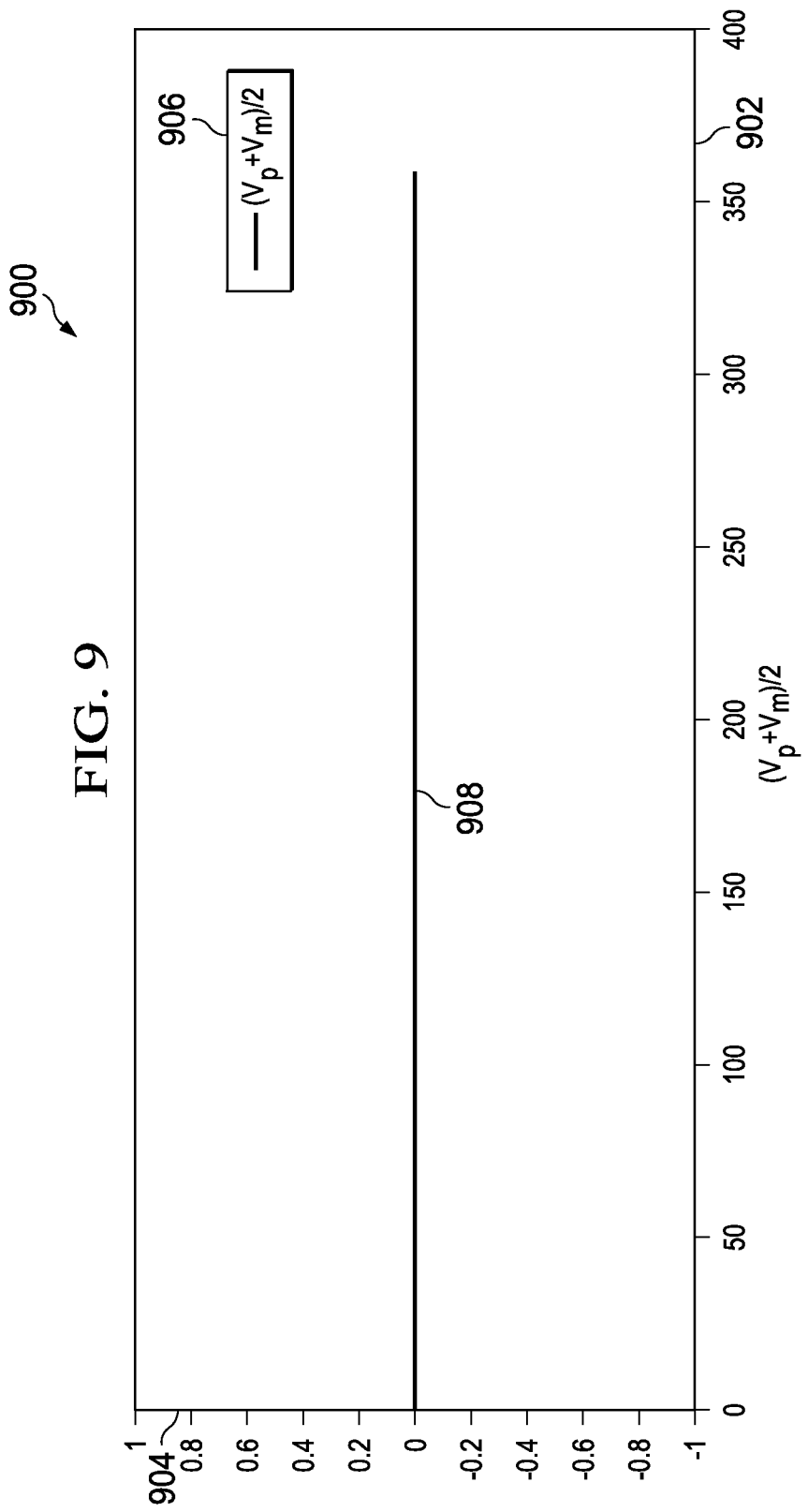
FIG. 9 is an illustration of a graph of common mode voltage in accordance with an illustrative embodiment.

With reference now to FIG. 9, an illustration of a graph of common mode voltage is depicted in accordance with an illustrative embodiment. In this illustrative example, graph 900 includes horizontal axis 902 and vertical axis 904. Horizontal axis 902 is phase in degrees. Vertical axis 904 is voltage level.

As indicated by legend 906, line 908 is the common mode voltage of direct current power supply 590 formed by rectifier 503 in FIG. 5. As depicted, the common mode voltage is substantially zero. In other words, direct current power supply 590 formed by rectifier 503 in FIG. 5 may have a common mode voltage of substantially zero.

Figure 10:
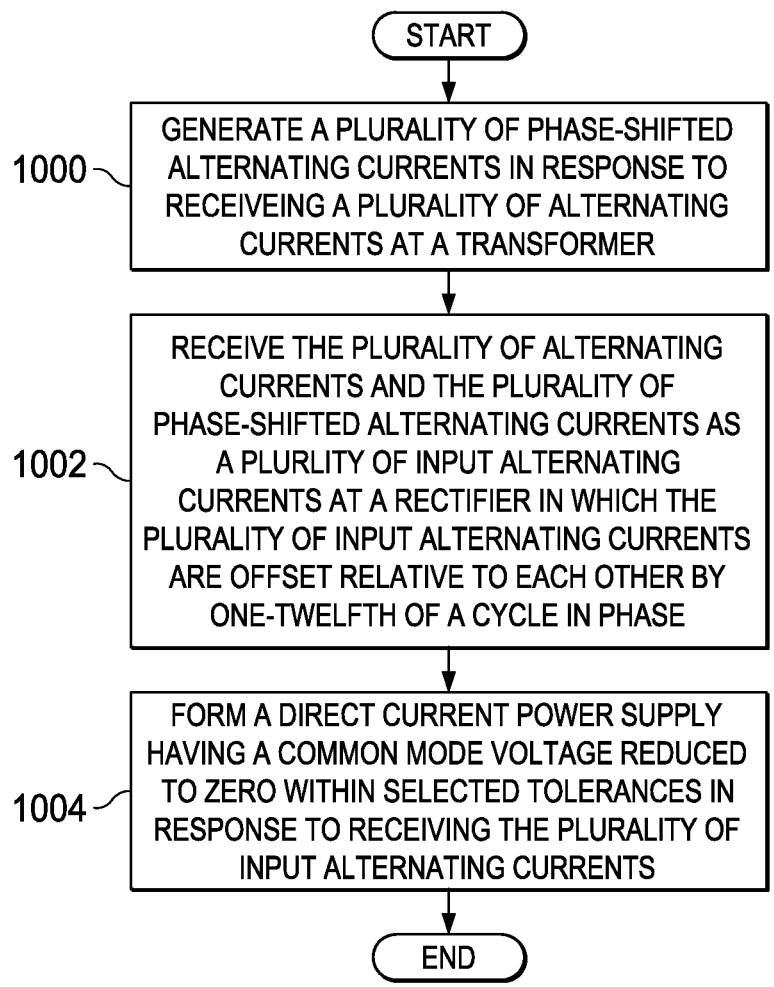
FIG. 10 is an illustration of a process for forming a direct current power supply in the form of a flowchart in accordance with an illustrative embodiment.

With reference now to FIG. 10, an illustration of a process for forming a direct current power supply is depicted in the form of a flowchart in accordance with an illustrative embodiment. The process illustrated in FIG. 10 may be implemented using transformer rectifier unit 100 in FIG. 1.

The process begins by generating a plurality of phase-shifted alternating currents in response to receiving a plurality of alternating currents at a transformer (operation 1000). The plurality of alternating currents and the plurality of phase-shifted alternating currents are received as a plurality of input alternating currents at a rectifier in which the plurality of input alternating currents are offset relative to each other by one-twelfth of a cycle in phase (operation 1002). The rectifier forms a direct current power supply having a common mode voltage reduced to zero within selected tolerances in response to receiving the plurality of input alternating currents (operation 1004), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a transformer configured to output a plurality of phase-shifted alternating currents in response to receiving a plurality of alternating currents, wherein the plurality of alternating currents is six alternating currents and the plurality of phase-shifted alternating currents is six phase-shifted alternating currents; and
   a rectifier configured to form a direct current power supply having a common mode voltage reduced to zero within selected tolerances and connected to receive the plurality of alternating currents and the plurality of phase-shifted alternating currents as a plurality of input alternating currents, wherein the plurality of input alternating currents is twelve input alternating currents including the six alternating currents and the six phase-shifted alternating currents, and wherein each of the twelve input alternating currents is offset relative to each of two other of the twelve input alternating currents by one-twelfth of a cycle in phase.

2. The apparatus of claim 1, wherein the transformer comprises:
   a single core having a plurality of legs; and
   a plurality of windings associated with the plurality of legs.

3. The apparatus of claim 2, wherein the plurality of windings comprises:
   a plurality of first windings;
   a plurality of second windings; and
   a plurality of third windings, wherein one of each of the plurality of first windings, the plurality of second windings, and the plurality of third windings is wrapped around each leg of the plurality of legs.

4. The apparatus of claim 3, wherein the plurality of legs comprises:
   a first leg, wherein a first winding in the plurality of first windings is wrapped around the first leg and a second winding in the plurality of second windings is wrapped around the first leg and wherein the second winding is connected to the first winding to form a connection; and
   a second leg, wherein a third winding in the plurality of third windings is wrapped around the second leg and connected to the connection between the first winding and the second winding.

5. The apparatus of claim 3, wherein each of the plurality of first windings has a first selected number of turns, each of the plurality of second windings has a second selected number of turns, and each of the plurality of third windings has a third selected number of turns in which the first selected number of turns, the second selected number of turns, and the third selected number of turns are different.

6. The apparatus of claim 1, wherein the direct current power supply has a dual-polarity output voltage that includes a positive voltage and a negative voltage.

7. The apparatus of claim 1 further comprising:
   a source configured to generate the plurality of alternating currents.

8. The apparatus of claim 7, wherein the source comprises:
   a first three-phase source configured to generate three of the plurality of alternating currents; and
   a second three-phase source offset in phase relative to the first three-phase source by about one-sixth of a cycle and configured to generate another three of the plurality of alternating currents.

9. The apparatus of claim 1, wherein the rectifier is a 24-pulse rectifier.

10. The apparatus of claim 1, wherein each alternating current in the plurality of alternating currents passes through zero windings before being received by the rectifier and wherein each alternating current passes through only two windings to produce a respective phase-shifted alternating current in the plurality of phase-shifted alternating currents.

11. An apparatus comprising:
a transformer configured to output a plurality of phase-shifted alternating currents in response to receiving a plurality of alternating currents, wherein the plurality of alternating currents is six alternating currents and the plurality of phase-shifted alternating currents is six phase-shifted alternating currents;
a rectifier configured to form a direct current power supply having a common mode voltage reduced to zero within selected tolerances and connected to receive the plurality of alternating currents and the plurality of phase-shifted alternating currents as a plurality of input alternating currents, wherein the plurality of input alternating currents is twelve input alternating currents including the six alternating currents and the six phase-shifted alternating currents;
wherein the transformer comprises a single core having a plurality of legs and a plurality of windings associated with the plurality of legs; and
wherein the plurality of windings comprises:
a first winding wrapped around a first leg in the plurality of legs and configured to receive a first alternating current in the plurality of alternating currents,
a second winding wrapped around the first leg in the plurality of legs, wherein the second winding is connected to the first winding to form a connection and configured to receive a second alternating current in the plurality of alternating currents, and
a third winding wrapped around a second leg in the plurality of legs, wherein the third winding is connected to the connection between the first winding and the second winding and to a line configured to carry a phase-shifted alternating current in the plurality of phase-shifted alternating currents to the rectifier.

12. The apparatus of claim 11, wherein a difference between a first phase of the first alternating current and a second phase of the second alternating current is about 60 degrees.

13. The apparatus of claim 12, wherein a third phase of the phase-shifted alternating current is offset from each of the first phase and the second phase by about 30 degrees.

14. An apparatus comprising:
a transformer configured to output a plurality of phase-shifted alternating currents in response to receiving a plurality of alternating currents, wherein the plurality of alternating currents is six alternating currents and the plurality of phase-shifted alternating currents is six phase-shifted alternating currents;
a rectifier configured to form a direct current power supply having a common mode voltage reduced to zero within selected tolerances and connected to receive the plurality of alternating currents and the plurality of phase-shifted alternating currents as a plurality of input alternating currents, wherein the plurality of input alternating currents is twelve input alternating currents including the six alternating currents and the six phase-shifted alternating currents;
wherein the transformer comprises a single core having a plurality of legs and a plurality of windings associated with the plurality of legs; and
wherein the plurality of legs includes six legs and the plurality of windings includes eighteen windings.

15. An apparatus comprising:
a core having a plurality of legs;
a plurality of first windings, wherein each of the plurality of first windings is wrapped around a corresponding leg of the plurality of legs and configured to receive a corresponding alternating current of a plurality of alternating currents;
a plurality of second windings, wherein each of the plurality of second windings is connected to a corresponding first winding in the plurality of first windings to form a connection and wrapped around a same leg around which the corresponding first winding is wrapped, and wherein each of the plurality of second windings is configured to receive a different corresponding alternating current of the plurality of alternating currents than the corresponding alternating current received by the corresponding first winding;
a plurality of third windings, wherein each of the plurality of third windings is wrapped around one of the plurality of legs and wherein a third winding in the plurality of third windings that is wrapped around a particular leg in the plurality of legs is connected to the connection formed by a first winding in the plurality of first windings and a second winding in the plurality of second windings that are wrapped around a different leg in the plurality of legs than the particular leg, wherein: the core, the plurality of first windings, the plurality of second windings, and the plurality of third windings form a transformer configured to output a plurality of phase-shifted alternating currents;
a rectifier configured to form a direct current power supply in response to receiving the plurality of alternating currents and the plurality of phase-shifted alternating currents;
a first set of lines configured to carry the plurality of alternating currents to the plurality of first windings and the plurality of second windings;
a second set of lines configured to carry the plurality of alternating currents to the rectifier; and
a third set of lines configured to carry the plurality of phase-shifted alternating currents from the plurality of third windings to the rectifier, wherein the plurality of alternating currents and the plurality of phase-shifted alternating currents form a plurality of input alternating currents for the rectifier.

16. The apparatus of claim 15, wherein the plurality of input alternating currents are offset relative to each other by one-twelfth of a cycle in phase.

17. The apparatus of claim 16, wherein the direct current power supply has a dual-polarity output voltage and wherein a common mode voltage of the direct current power supply is reduced to zero within selected tolerances.

18. A method for forming a direct current power supply, the method comprising:
generating a plurality of phase-shifted alternating currents at a transformer in response to receiving a plurality of alternating currents, wherein the plurality of alternating currents is six alternating currents, the plurality of phase-shifted alternating currents is six phase-shifted alternating currents;
receiving the plurality of alternating currents and the plurality of phase-shifted alternating currents as a plurality of input alternating currents at a rectifier, wherein each of the input alternating currents in the plurality of input alternating currents is offset relative to each of two other of the input alternating currents in the plurality of input alternating currents by one-twelfth of a cycle in phase; and forming the direct current power supply having a common mode voltage reduced to zero within selected tolerances in response to receiving the plurality of input alternating currents at the rectifier.

19. A method for forming a direct current power supply, the method comprising:

generating a plurality of phase-shifted alternating currents at a transformer in response to receiving a plurality of alternating currents, wherein the plurality of alternating currents is six alternating currents, the plurality of phase-shifted alternating currents is six phase-shifted alternating currents;

receiving the plurality of alternating currents and the plurality of phase-shifted alternating currents as a plurality of input alternating currents at a rectifier, wherein the input alternating currents in the plurality of input alternating currents is offset relative to each other by one-twelfth of a cycle in phase;

forming the direct current power supply having a common mode voltage reduced to zero within selected tolerances in response to receiving the plurality of input alternating currents at the rectifier;

receiving a first alternating current in the plurality of alternating currents at a first winding wrapped around a leg in a plurality of legs of a single core; and receiving a second alternating current in the plurality of alternating currents at a second winding wrapped around the leg, wherein the second winding is connected to the first winding to form a connection.

20. The method of claim 19, wherein generating the plurality of phase-shifted alternating currents comprises:

generating a phase-shifted alternating current using a third winding connected to the connection between the first winding and the second winding, wherein the third winding is wrapped around a different leg in the plurality of legs of the core.

* * * * *